Aug. 26, 1969  H. W. UPTON  3,463,885
SPEECH AND SOUND DISPLAY SYSTEM
Filed Oct. 22, 1965  9 Sheets-Sheet 1

INVENTOR.
HUBERT W. UPTON
BY
ATTORNEY

Aug. 26, 1969  H. W. UPTON  3,463,885
SPEECH AND SOUND DISPLAY SYSTEM

Filed Oct. 22, 1965  9 Sheets-Sheet 8

INVENTOR.
HUBERT W. UPTON

BY *George Galuuski*

ATTORNEY

Aug. 26, 1969     H. W. UPTON     3,463,885
SPEECH AND SOUND DISPLAY SYSTEM
Filed Oct. 22, 1965     9 Sheets-Sheet 9

INVENTOR.
HUBERT W. UPTON
BY *George Johnstein*
ATTORNEY

United States Patent Office 3,463,885
Patented Aug. 26, 1969

3,463,885
SPEECH AND SOUND DISPLAY SYSTEM
Hubert W. Upton, Arlington, Tex., assignor to
George Galerstein, Dallas, Tex.
Filed Oct. 22, 1965, Ser. No. 505,136
Int. Cl. H04m 1/02
U.S. Cl. 179—1      14 Claims

ABSTRACT OF THE DISCLOSURE

To augment normal lip reading, such characteristics of speech as plosive sounds, fricatives, and voicing are displayed as lights superimposed upon a normal field of vision.

---

This invention relates to speech reading devices and, in particular, to a head mounted speech and sound display system.

By means of observing the placement and form of a speaker's lips and his facial expressions, and the associating of the placement and form of the lips and the facial expressions with certain sounds, a person with limited or no hearing capability can learn to distinguish some spoken sounds and to understand some speech that he is unable to hear. This technique, commonly referred to as lip-reading, has been of proven aid to persons hard of hearing or deaf, but it falls considerably short of providing the practitioner with full and satisfactory understanding of the spoken thought. Even in the case of those who may attain a relatively high degree of proficiency in sound discrimination by lip-reading, there are factors that tend to preclude satisfactory visual recognition of speech through the practice of "lip-reading" alone.

One reason for this is that the sounds of a spoken language are only partly formed by lip and/or mouth movements that are visible to the observer. The sounds of speech are also generated and formed by the voice box, throat, mouth cavity and tongue, and rely in good part upon physical activity by these other sound producing parts of the body, which is not distinguishable to the viewer. Thus, the "lip-reader" can hope to interpret only a portion of speech, i.e., that portion produced by placement and formation of the visible speech producing parts of the body, principally the lips.

Another reason is that there are certain sounds or groups of sounds produced by either the same or similar movement and placement of lips and it is effectively impossible to distinguish between these sounds by lip-reading.

Considerable effort has been expended over the years in translating speech sounds into recognizable visual form to overcome the above noted deficiencies of the lip-reading method. However, as yet, no system has been devised which represents, in practice, a meaningful improvement over lip-reading. Where the sounds of normal speech patterns have been produced in visual form on a screen, or other object, the time required for recognition of the symbols for adequate comprehension of the actual speech pattern producing these symbols has been excessive.

It is one object of the present invention to provide means of overcoming the deficiencies present in the lip-reading method and to provide the deaf and the hard-of-hearing with improved capability of speech recognition.

According to the invention, such capability is provided by the visual representation of selected speech sounds (preferably those for which there is no, very little, or non-distinctive lip movement) that can be easily understood by the "listener" while he simultaneously engages in normal lip-reading practice. In general, my invention translates acoustic signals into easily recognizable visual signals, and presents these signals to the viewer (listener) directly or indirectly, by means of a head mounted display so that they can be effectively superimposed from the listener's point of view, upon the speaker's features, as upon his lips. In this manner, the additional information provided through the listener's head mounted, visual display is assimilated by him while he is looking at the speaker's features, and he can correlate this additional visual information simultaneously with that information to be gained by lip-reading.

Thus, it is an object of this invention to provide means of visual recognition of these speech sounds within the context of, and of a type compatible with, lip-reading.

It is an object of this invention to significantly supplement the visual information presently available for understanding of the spoken word.

It is an object of this invention to present additional visual speech information in such manner that it may be absorbed and correlated with other normally available information.

It is an object to provide a device that has utility as a training aid to teach deaf persons to speak intelligibly.

It is an object of this invention to provide a sound analyzing eyeglass type visual display.

It is an object of this invention to increase the capability of understanding of the spoken word by those persons with limited or no hearing.

Another object is to provide a sound-analysis display that will enable easy visual recognition of standard directing signals such as telephone rings, fire alarms, sirens, doorbells, etc.

An additional object is to enhance the teaching of languages.

A phoneme is the smallest unit of speech, or speech sound, that in any given language distinguishes one utterance from another, as the p in pin and the f in fin, by which these two English words are distinguished from each other. As previously noted, there are spoken sounds, or phonemes, that are not produced by distinctive speech gestures, but rather by lip, tongue and teeth formations that are either nonvisible, very difficult to visually identify, or easily confused with the lip movements for other sounds. Examples of sounds with no, or very little, visible lip movement are the sounds produced for the letters t, d, l, h and j. Examples of sounds involving lip movements that are easily confused with the lip movements of other sounds are those produced for the letters p, b and m; all three are formed with the lips first closed and then opened. Also, for the letters f and v, the lips and teeth are about identically positioned; and for the letters r and w, the lips are rounded in the same fashion, all of the above making it extremely difficult, if not impossible, to identify many spoken words.

However, the sounds or phonemes that are produced by non-visible or non-distinctive speech gestures do have certain distinguishable sound or audio qualities. The qualities that I treat in the particular embodiments illustrated and described herein are known as "voiced," "plosive" and "fricative" phonemes. By "voiced" is meant the tone produced in the language that is sonant, as opposed to voiceless or breathed, typical examples being qualities of the sound for all vowels and the consonants z and g. By "plosive" is meant an explosive quality of sound such as for the letters p and b. By "fricative" is meant a tone characterized by frictional rustling of the breath as it is emitted, such as may be heard when articulating the letters s and f. Each of these phonemes has identifying audio wave qualities, and, as shown in detail hereinafter, I analyze and distinguish these phonemes in the electrical network of my speech analyzer on the basis of their audio qualities, thereafter actuating an appropriate display signal on or through a head-mounted lens or lenses, as on spectacles, worn by the "listener."

Figure 1:
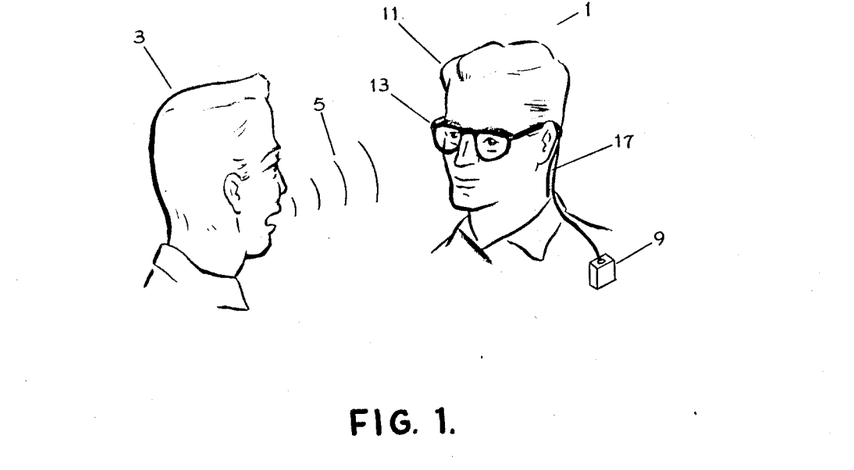
FIG. 1 is a view, in perspective, of an embodiment of the invention in use.

As illustrated in FIG. 1 the user 11 of the invention is "listening" to speaker 3 and is wearing a pair of spectacles 13. Electrical leads 17 extend from the spectacles to a unit 9 containing a microphone 7, an amplifier 19 and an analyzer 21 in accord with the system block diagram of FIG. 2.

Figure 2:
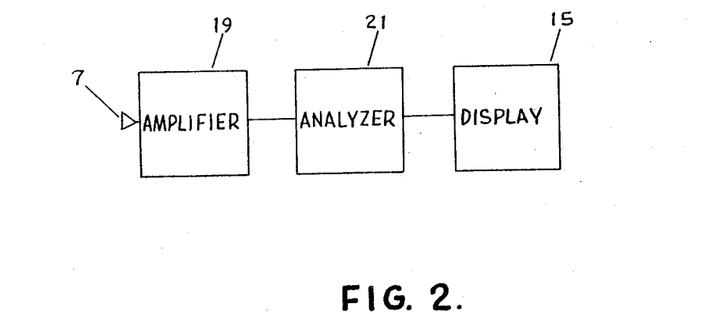
FIG. 2 is a schematic view illustrating basic system components of the invention.

Referring to FIG. 2 the system operates in the following manner. The audio waves 5 (FIG. 1) are picked up by the microphone 7 and initiate an electrical impulse which is amplified by amplifier 19, and transmitted to analyzer 21. The analyzer distinguishes the phonemes present in the audio waves 5 as voiced, plosive or fricative, and actuates a visible signal on the display 15.

Figure 3:
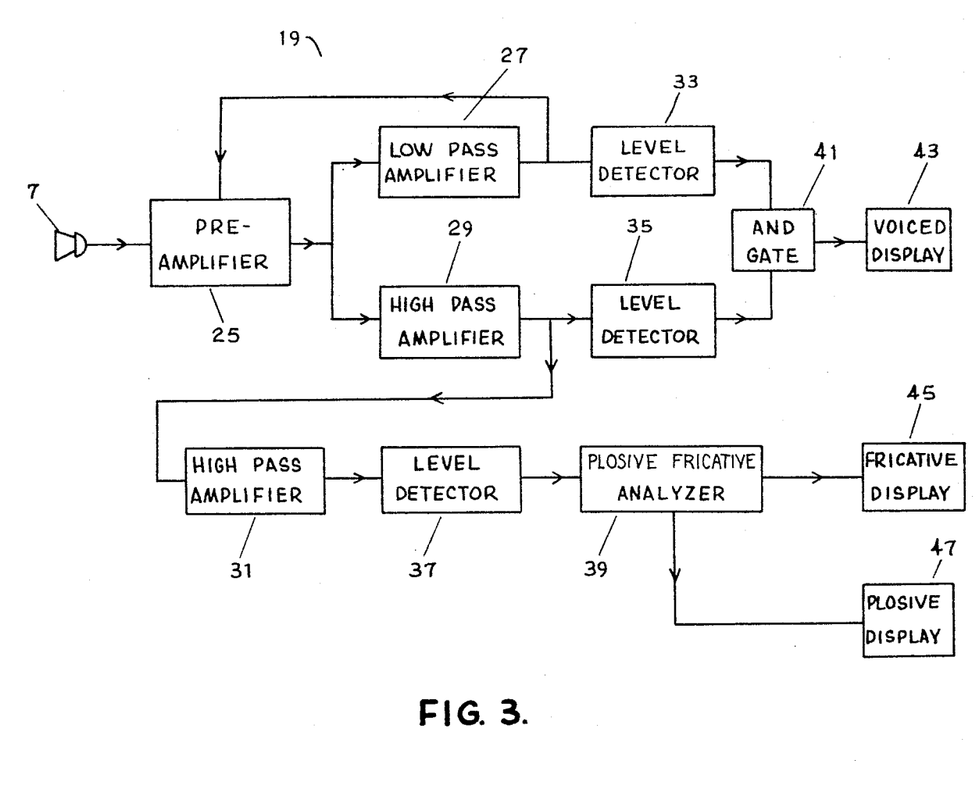
FIG. 3 is a schematic view illustrating system components of the embodiment of FIG. 1.

FIG. 3 offers a more detailed explanation of the system, illustrating a manner of analysis of the various phonemes. The sound waves are picked up by microphone 7, passed through preamplifier 25 and filtered into low and high frequency bands by the low-pass amplifier 27 and high-pass amplifier 29 respectively. The filtered outputs of amplifiers 27 and 29 are applied to level detectors 33 and 35, each of which generates an output voltage when its input signal is greater than a predetermined level. The outputs of detectors 33 and 35 are applied to AND gate 41. As voiced phonemes carry a distribution of both high and low frequencies within the human speech frequency spectrum, when signals from both level detectors 33 and 35 are present, this indicates the presence of both high and low frequency energy in the audio wave, and AND gate 41 is opened to activate voiced display 43.

Figure 8:
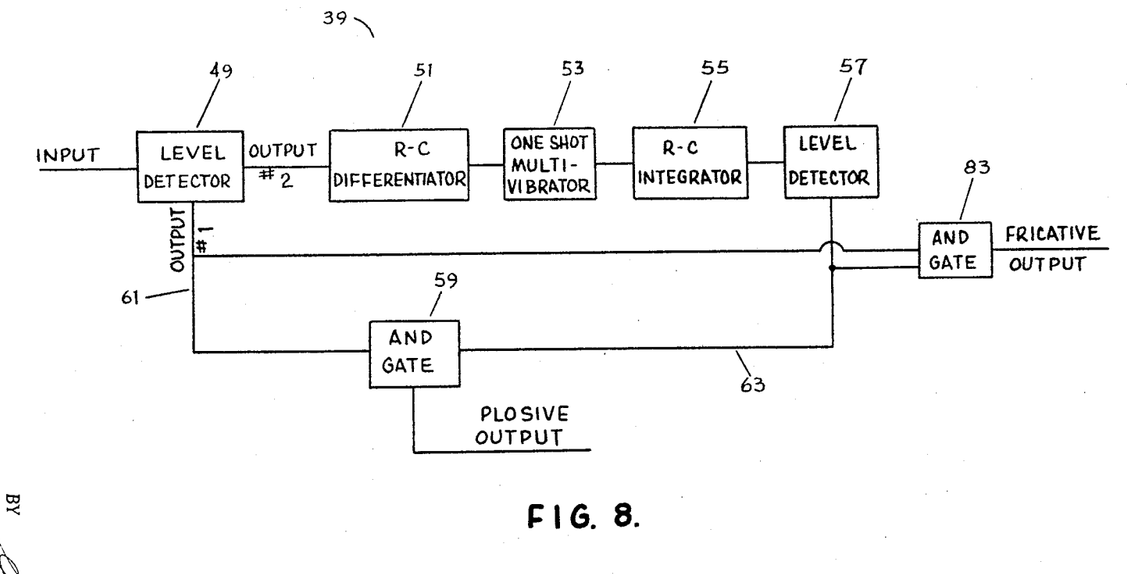
FIG. 8 is a schematic view illustrating the plosive-fricative analyzer of FIG. 3.

Plosive and fricative phonemes are composed of frequencies in the same general higher frequency band and are therefore not readily distinguishable by frequency comparison. However, the plosive phoneme has a shorter time duration than the fricative phoneme and identification of the plosive and fricative phonemes can be accomplished on that basis, as follows. The output from high-pass amplifier 29 is routed to high-pass amplifier 31, which passes only higher frequencies than filter 29 and thus filters out the lower voice frequencies, and the signal is then directed from amplifier 31 to fricative-plosive analyzer 39. Referring to FIG. 8, fricative-plosive analyzer 39 comprises level detector 49, R-C differentiator 51, one shot multivibrator 53, R-C integrator 55, level detector 57 and AND gates 59 and 83. At the point of entry into level detector 49, the signal is either of the higher frequency fricative or plosive phonemes, the lower frequency voiced phonemes having been previously filtered out by the high pass filter 31. When the signal from high pass filter 31 exceeds a predetermined level, a voltage is generated by level detector 49, and output #2 from detector 49 causes a pulse of short duration at the output of R-C differentiator 51. This pulse activates one shot multivibrator 53 which generates a pulse of fixed duration. The fixed duration pulse charges R-C integrator 55 until a predetermined signal level is attained, at which time the level detector 57 is triggered and a signal is applied to AND gate 59. The sequence of pulse generation, integration and level detection takes a finite period of time that is arranged to be slightly longer than the duration of a plosive phoneme. Another signal is simultaneously transmitted directly from output #1 of level detector 49 over wire 61 to AND gate 59. Output #1 normally has a positive voltage when the input to the level detector 49 is less than a predetermined level. When the input exceeds the predetermined level, output #1 switches to approximately zero volts. AND gate 59 is designed to be open only if all inputs are positive, and closed if any one input is less than approximately one volt. Therefore, so long as the input signal to level detector 49 exceeds the predetermined level, output #1 will keep AND gate 59 closed. As has been noted, the plosive phonemes are of short duration, compared to the fricative phonemes. Accordingly, if the phoneme being analyzed is indeed plosive, then if will be of short duration and the signal from detector 49 over wire 61 to the AND gate 59 will have returned to a positive voltage before arrival at the AND gate of the time-delayed signal from detector 57. Thus, at this time both inputs to AND gate 59 will be positive, which will cause an on or open condition in the AND gate and thus a plosive output. On the other hand, if the phoneme being analyzed is fricative, i.e. of relatively extended duration and of longer duration than the time required for the time-delayed signal to arrive at AND gate through detector 57, then, when there is a signal from level detector 57, there will be a zero voltage from output #1 of detector 49 and AND gate 59 will be closed. Hence, the fricative phoneme will be electrically aborted. Stated simply, this portion of the plosive-fricative analyzer 39 examines the phoneme's high frequency energy content; if the energy time period is shorter than a pre-determined period the phoneme is analyzed as plosive and the AND gate 59 is opened.

However, if the sound being analyzed is fricative, and therefore of longer duration than the time it takes the time-delayed signal to reach level detector 57, AND gate 59 is closed. However, in this case, output #1 of level detector 49 will still be present when level detector 57 is triggered. Therefore, AND gate 83 is arranged to be open when the two signals are simultaneously present at the gate input, and can thus pass the fricative phoneme signal and actuate the fricative display.

Distinguishing electrical signals having thus been derived to identify the voiced, fricative and plosive phonemes, it now remains to present this information to the "listener."

Figure 9:
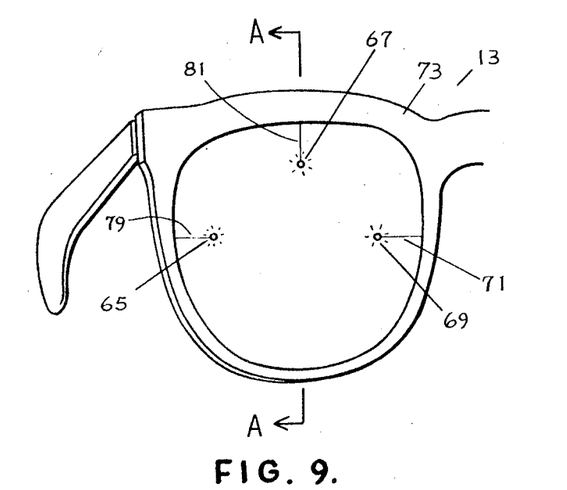
FIG. 9 is a view looking at the lens of the spectacles shown in FIG. 1.

Three display circuits are provided to activate a voiced indicating bulb 69, fricative indicating bulb 67 or a plosive indicating bulb 65 (FIG. 9). Typical display circuitry shown in FIG. 12 has a positively biased emitter in transistor 85. When the input valve to the transistor exceeds the bias valve, current then flows through the transistor's collector circuit illuminating the appropriate phoneme indicating bulb.

As previously noted, my invention contemplates a display that is effectively superimposed, from the speech-reader's point of view, upon the speaker's features or, in any event, so that it may be observed by the "listener" while he is simultaneously viewing the speaker. As illustrated, I achieve this end by having the voice, fricative and plosive outputs energize display lights located on or otherwise associated with the head mounted (as on an eyeglass frame) lens worn by the "listener." Referring to FIG. 9, the voiced, fricative and plosive outputs over wires 71, 81 and 79 respectively are directed to three miniature incandescent bulbs 69, 67 and 65 that are cemented into pre-drilled holes on the concave side of the lens 13, with the globe of the bulb directed away from the lens towards the viewing eye of the "listener." While the term lens generally connotes a piece of glass curved so as to change the direction of the rays of light that may pass through it, the term as used herein is not so limited but includes any transparent material, curved or flat, suitable for the purposes herein set forth. If a speaker should utter the words "mat" and "pat," there would ordinarily be no apparent difference to the lip reader whereas, with the present invention, they are easily distinguishable. When the m of "mat" is uttered, the light 69 will flush, notifying the speech-reader that the phoneme is voiced, rather than fricative or plosive. The letter a of "mat," being voiced, will cause the voice light 69 to flash, notifying the speech-reader that the phoneme is voiced rather than fricative, and the letter t, being plosive, will activate plosive light 65. Thus, the sequence of lights will be 69–69–65, or as light 69 has two flashes in a row the sequence may be first a longer flash of 69 and then a short flash of 65. For the word "pat" however, light 65 will flash first, as p is a plosive phoneme, and the sequence of flashes for "pat" would be 65–69–65. The context of the speech in addition to the observed plosive or voiced quality, as indicated by the light sequencing, will enable the speech reader to recognize the word.

Should a phoneme have dual qualities, such as the both voiced and plosive b in "bat," bulbs 65 and 69 would both flash on as be is uttered enabling a positive identification of be and the word "bat," as opposed to the word "pat," for example. Likewise, for the phoneme z, which is both voiced and fricative, lights 69 and 67 will flash on at the same time, thus distinguishing from the letter "s" which is produced by using the same basic lip formation as for z, but which is only fricative. By locating the lights as shown in FIG. 9, the listener can direct his sight at the speaker and his peripheral vision will pick up the flashing lights. As the viewer is focusing on a plane some distance beyond the plane of the lights, they will appear out of focus and fuzzy but it has been determined that the lamps can be positioned with respect to each other so as to enable discrimination between the individual light sources, and full recognition of the light pattern and sequence that is being presented.

Figure 11:
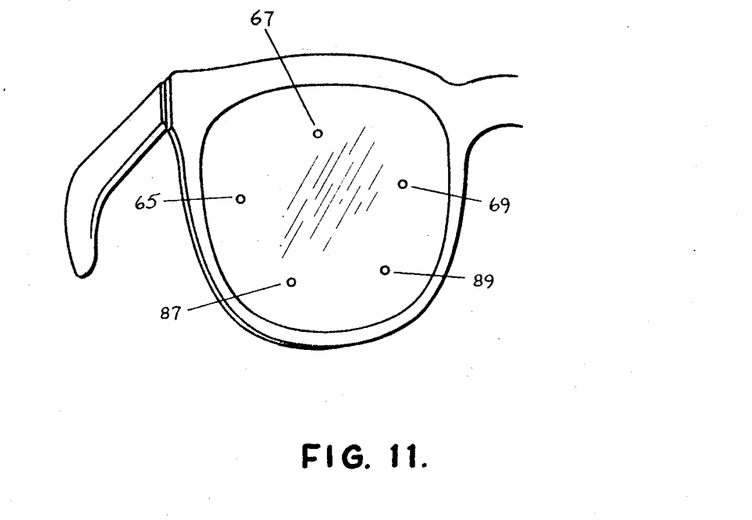
FIG. 11 is a view looking at the lens of spectacles as shown in FIG. 1, illustrating another embodiment of the invention.

Another form of display that presents additional information is illustrated in FIG. 11, wherein five bulbs are provided, three of which, 65, 67 and 69, indicate the voiced, fricative and plosive phonemes respectively, while bulbs 87 and 89 indicate combined fricative and voiced, and plosive and voiced characteristics, respectively. In this embodiment, more complete information is presented particularly with respect to the sequencing of successive phonemes that comprise a word. It has been determined that speech recognition is improved if single lights are flashed to indicate each class of phonemes, even if multiple qualities are present which precludes the necessity of recognizing combinations of light patterns. For instance, in the embodiment of FIG. 9, recognition of the phoneme b, followed by a vowel, all of which are voiced, is dependent upon recognition of the simultaneous flashing of plosive and voice lights 65 and 69 followed by the flashing of light 69 for the vowel. In the embodiment of FIG. 11, during sounding of the b, only light 89 (combined plosive and voice) is activated which is followed by light 69 for the vowel.

It will be readily appreciated that limitless arrangements and combinations of bulbs can be made which will be influenced by the amount of additional information that it is desired to present to the listener. This will depend in part upon the degree of information that can be readily absorbed within the context of ordinary speech patterns and, in particular cases, may depend in part upon the listener's degree of hearing impairment. The lesser the degree of hearing impairment, the lesser the additional information required as more basic information will be gathered from auditory stimulus along with lip reading, etc.

Figure 10:
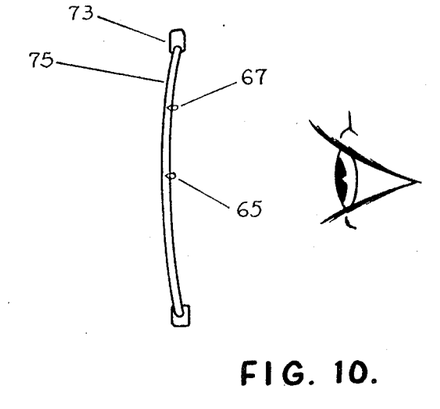
FIG. 10 is a sectional view taken through section a—a of FIG. 9.

Whereas FIGS. 9, 10 and 11 involve what may be referred to as a direct presentation of the visual information by mounting of the lamps directly on the lens or lenses, the presentation may, of course, be indirectly presented as by reflection. A type of apparatus that may be employed to achieve such indirect presentation of the visual signal is disclosed in my co-pending application entitled Eyeglass Mounted Presentation Device for Visual Information, filed July 20, 1962 employing a CRT display wherein the display is projected or reflected by means of a spectacle-type viewing device so as to appear to originate from a source beyond the lens in front of the viewer. With this method of presentation the visual signals can be made to appear truly superimposed on the plane of the speaker's features and this can be in precise focus to the viewer.

Representative circuitry for the preamplifier 25, level detectors 33, 35, 37, 49 and 57, high pass amplifiers 29 and 31, low pass amplifier 27 and the AND gates 59 and 83 are shown in FIGS. 4, 5, 6 and 7.

Figure 4:
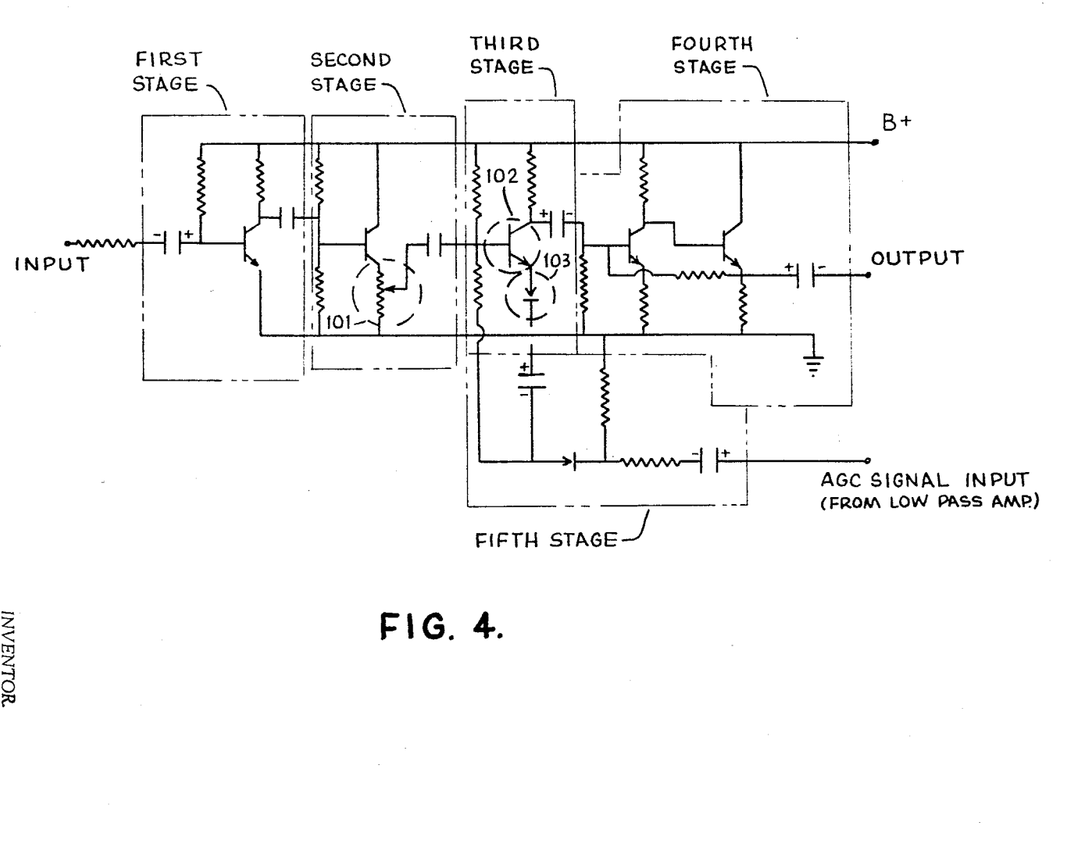
FIG. 4 is a circuit diagram of the preamplifier of FIG. 3.

FIG. 4 illustrates a five transistor, R-C coupled, transistor audio amplifier. The first stage provides amplification of the signal while the second stage, an emitter follower, provides isolation between the first and third stages with the potentiometer 101 serving to provide manual gain control. Additional gain is provided by the third stage which is controlled by the Automatic Gain Control signal from the output of the low pass amplifier 27 (FIG. 3) by changing the bias on the transistor 102 and on the germanium diode 103 of the third stage. Resistance of the diode varies with current thus modifying the amount of feedback in the circuit and controlling the gain of the stage. Further gain is furnished through the fourth stage.

Figure 7:
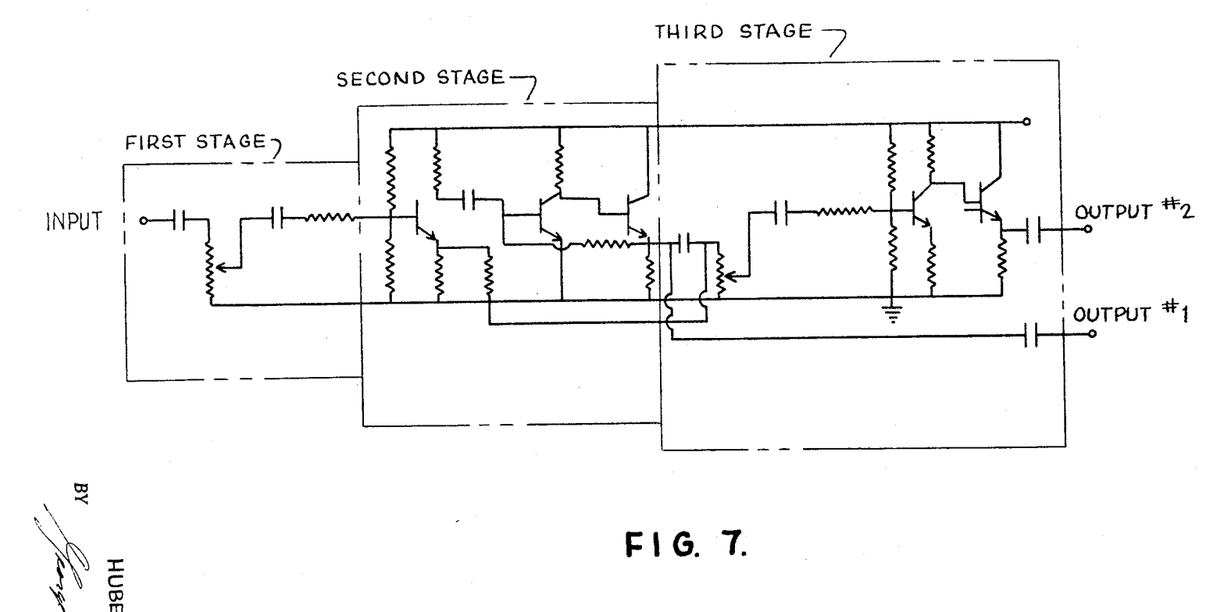
FIG. 7 is a representative circuit diagram of the high pass amplifier of FIG. 3.

In the high pass amplifier circuitry of FIG. 7 output #1 represents the output for high pass amplifier 29 and output #2 represents the output for high pass amplifier 31. The circuitry is conventional and well known to persons in the art. In this particular embodiment of my invention I have selected characteristics for output #1 such that it is essentially flat between 2500 and 10,000 c.p.s., whereas output #2 rises at a rate of 6 decibels per octave above 4000 c.p.s. and falls off sharply below 4000 c.p.s.

Figure 6:
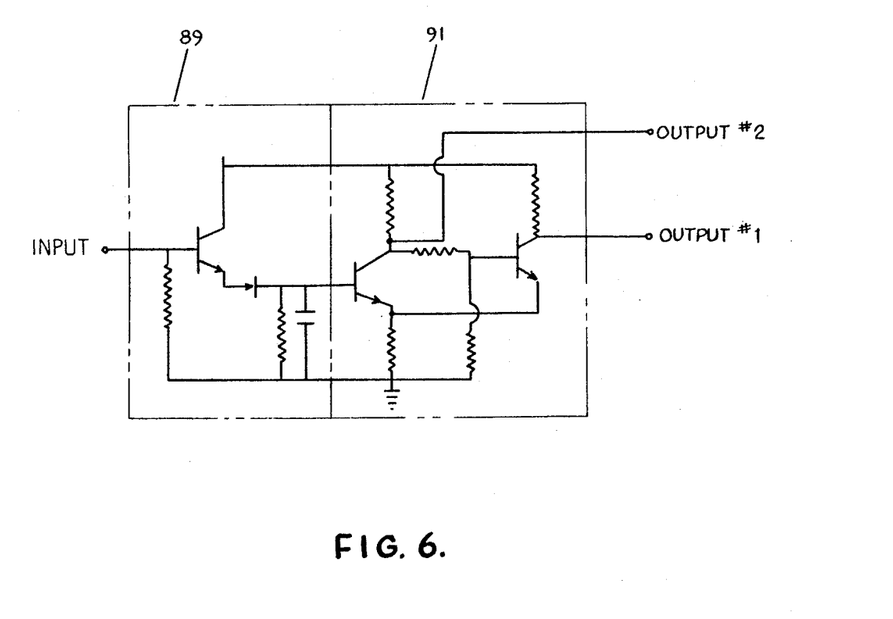
FIG. 6 is a representative circuit diagram of the level detectors of FIGS. 3 and 8.

A typical circuit for level detectors 33, 35, 37, 49 and 57 is shown in FIG. 6. Circuit 89 serves as an isolation stage and rectifier. Circuit 91 is a Schmitt trigger which changes state when the input rises to a predetermined level. With no input signal, output #1 is near zero volts and output #2 is at some positive voltage. When the input signal rises to a predetermined value, output #1 switches to a positive voltage and output #2 switches to zero volts.

Figure 5:
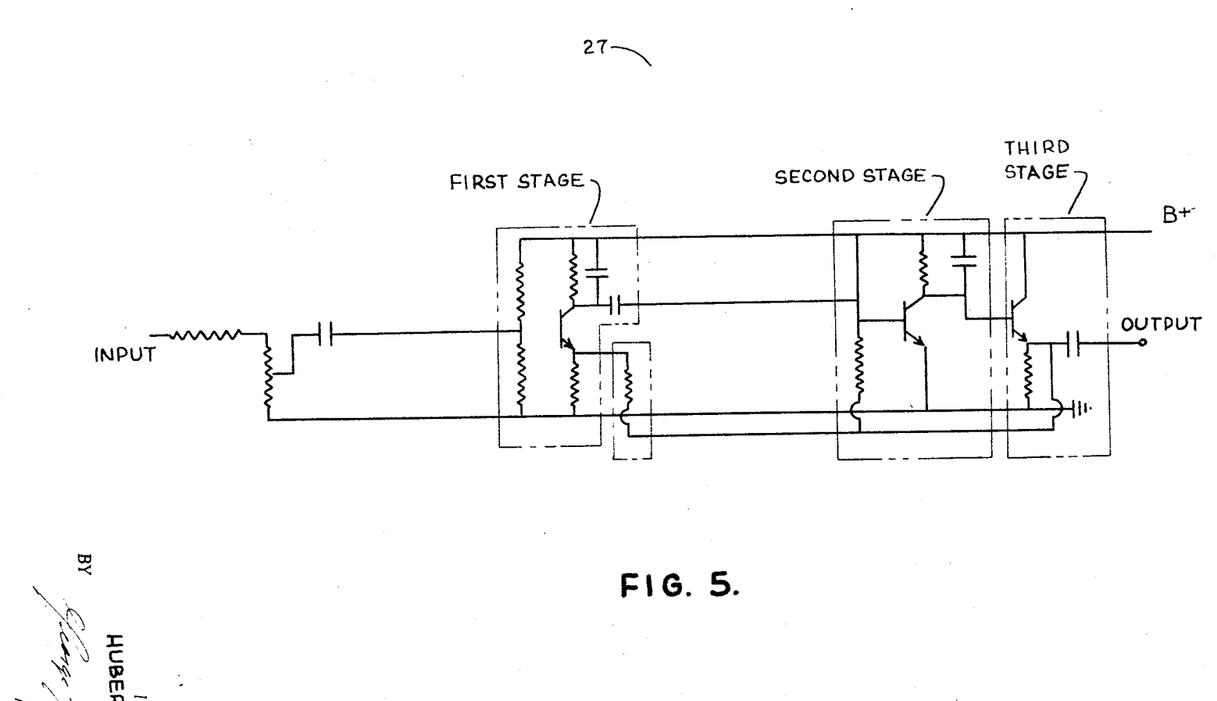
FIG. 5 is a circuit diagram of the low pass amplifier of FIG. 3.

With reference to FIG. 5, the low pass amplifier 27 is a three state, R-C coupled, transistor amplifier. In the embodiment herein discussed, the low pass amplifier permits passage of frequencies between 80 and 500 c.p.s.

Figure 12:
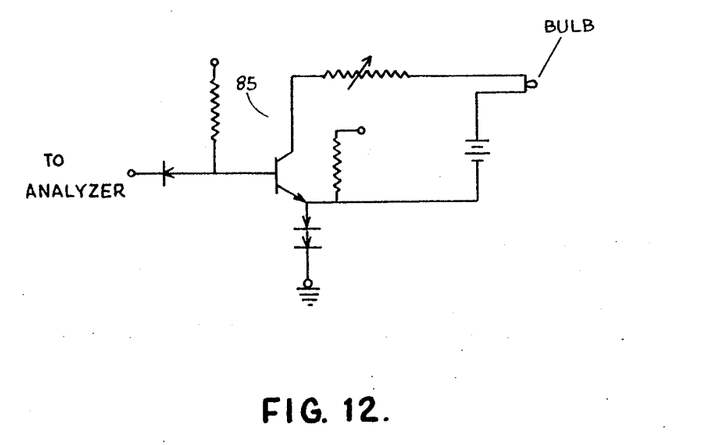
FIG. 12 is a typical circuit diagram of the display of FIG. 3.

Circuitry of AND gates 59 and 83, part of the displays 43, 45 and 47 of FIG. 3 is shown in FIG. 12. It is of conventional design and is open when all input signals to the circuit are positive. The emitter of the transistor 85 is biased one volt positive. If any one of the input signals is less than one volt positive the transistor will be "off" and no current will flow in the collector circuit.

If desired, other helpful information can easily be furnished with the present invention. For example, the letters t and k are both sounded by non-visible speech gestures and both are plosive phonemes. Consequently, additional information to distinguish between these two letters may be desired. Accepting as fact that prior to utterance of the "t" phoneme there is uniquely a slight pause on the part of the speaker, if the pause can be detected, and yet not confused with an actual stoppage of speech, then the letter t can be distinguished in this invention from the letter k, particularly as the information will be presented within the context of all the information being otherwise accumulated by lip reading, observation of gestures, general appreciation of subject matter, etc. This can be accomplished with a system of circuitry like that illustrated for the plosive detecting portion of the plosive fricative analyzer 39 (FIG. 8), except that in this case, the outputs from the level detector 49 would be reversed. Output #1 would actuate the time delay mechanism while output #2 would lead to AND gate 59 over wire 61. For this purpose, it would be the absence rather than the presence of energy leading to the level detector 49 that actuates the time-delayed pulse through the R-C differentiator, one shot multivibrator, and R-C integrator to the AND gate. Then if speech is not continued within a very short time after the pause, that is, if there is a speech stoppage before the time-delayed pulse reaches the AND gate there will be no voltage on wire 61 and the gate will be closed. If, however, speech is continued within a very short predetermined time, as would occur when articulating the letter t in normal speech context, when the time-delayed pulse reaches the AND gate, there will be a positive input to both sides of the gate and it will be open, the display then being actuated to indicate the utterance of a "t."

It will be noted that the invention overcomes one of the great difficulties that has been encountered in translating spoken language into understandable visual form which is the monumental amount of visual information that has been heretofore considered necessary, and indeed, with all previous devices has been necessary, to be transmitted to the listener.

Other advantages of my invention are available to non-hearing and hearing persons alike. One such advantage, applicable to the teaching of languages, is that the invention provides a means whereby the student, while observing the instructor, can also note the visual pattern formed on the spectacle display by the instructor's pronunciation of a sound or word and can compare the pattern formed by his own attempt to pronounce the same sound or word. Similarly, the invention offers advantages in its use as a training aid to teach deaf children to speak.

The invention also makes it possible for the deaf or hard of hearing to readily and immediately appreciate the presence of certain warning, direction, or information sounds, such as may be transmitted by telephone, radio, doorbells, alarm clocks, sirens, etc. Each of these sounds can be analyzed and converted into a distinctive visual display in the manner herein described that will immediately be presented to the "listener" by virtue of the fact that, with the head mounted display, the signal will be immediately presented to the listener whatever may be his line of sight.

It will be readily apparent to those skilled in the art that modifications or additions can be made to the circuitry illustrated and described with respect to the embodiments set forth herein and that many other circuits can be designed to analyze and distinguish between the voiced, fricative and plosive phonemes and other sounds that may be the subject of a particular embodiment utilizing the invention. For example, it is presently within or close to microminiaturization capabilities to provide circuitry of the type herein illustrated that can be incorporated almost entirely within the frame of eyeglass spectacles. Similarly, although the embodiments described herein utilize, as the display means, miniature bulbs that are turned on to indicate the utterance of a particular phoneme or sound, the invention is not limited thereto but various types of displays and display patterns may be used. An electroluminescent, transparent material lends itself very well to use in my invention, such material being visible upon actuation by electrical signal from the display generator and essentially nonvisible at all other times. Also, color coding of the visual signals employed could be of assistance in the ready transmittal of the desired information.

Thus, it is to be understood that changes and modifications to the embodiments as illustrated and described may be made without departing from the spirit of the invention or the scope of the appended claims.

I claim:

1. Apparatus for analyzing an electrically detected audio signal for visual display to a viewing person, comprising
    speech analyzing means for detecting the presence of speech components occurring in a plurality of different frequency bands and for detecting the time durations of said components and developing therefrom a plurality of respective signals for respective speech characteristics in said speech sound, and
    a plurality of individual indicators superimposed upon the normal field of vision of the viewing person connected for actuation by said respective signals, such that the viewing person may visually discern a speech sound by the display presented by said indicators.

2. Apparatus for analyzing an electrically detected audio signal for visual display in accordance with claim 1, wherein said indicators include individual lights operably mounted to an eyeglass frame in the normal vision area of the viewing person.

3. Apparatus for analyzing an electrically detected audio signal for visual display in accordance with claim 1, wherein said indicators include electroluminescent material operably mounted to an eyeglass frame in the normal vision area of the viewing person, different portions of said material being illuminated as the different indicators by different ones of said respective signals.

4. Apparatus for analyzing an audio signal for visual display to a viewing person, comprising
    phoneme analyzing means including
        a voiced sound detector for developing a first signal when there is a voiced sound present in an analyzed phoneme,
        a plosive sound detector for developing a second signal when there is a plosive sound present in an analyzed phoneme, and
        a fricative sound detector for developing a third signal when there is a fricative sound present in an analyzed phoneme, and
    a plurality of individual indicators superimposed upon the normal field of vision of the viewing person connected for actuation by said first, second and third signals, such that the viewing person may visually discern a phoneme by the display presented by said indicators.

5. Apparatus for analyzing an audio signal for visual display in accordance with claim 4, wherein said plurality of individual indicators includes
    a first indicator disposed within the normal field of vision of the viewing person connected for actuation by the presence of said first signal,
    a second indicator disposed within the normal field of vision of the viewing person spatially separated from said first indicator and connected for actuation by the presence of said second signal, and
    a third indicator disposed within the normal field of vision of the viewing person spatially separated from said first and second indicators and connected for actuation by the presence of said third signal.

6. Apparatus for analyzing an audio signal for visual display in accordance with claim 4, wherein said plurality of indicators number more than three, at least one of said indicators being actuated by a combination of at least two of said first, second and third signals.

7. Apparatus for analyzing an audio signal for visual display in accordance with claim 4, wherein said voice sound detector comprises
    low frequency detection means for producing an output when low frequency components above a predetermined amplitude level are present in the audio detected signal,
    high frequency detection means for producing an output when high frequency components above a predetermined amplitude level are present in the audio detected signal, and
    gate means connected to said low frequency detection means and said high frequency means for developing said first signal when there are outputs from both of said detection means.

8. Apparatus for analyzing an audio signal for visual display in accordance with claim 4, wherein said plosive sound detector comprises
    high frequency detection means for producing a first output when high frequency components above a predetermined amplitude level are present in the audio detected signal,
    delay means operatively connected to said first output for producing a second output after the time for a plosive sound in said analyzed phoneme will have subsided below said predetermined amplitude level, and before the time for a fricative sound in said analyzed phoneme will have subsided below said predetermined amplitude level, and
    gate means operatively connected to said first and second outputs for developing said second signal when there is a second output without there being a first output.

9. Apparatus for analyzing an audio signal for visual display in accordance with claim 4, wherein said fricative sound detector comprises
    high frequency detection means for producing a first output when high frequency components above a predetermined amplitude level are present in the audio detected signal,
    delay means operatively connected to said first output for producing a second output after the time for a plosive sound in said analyzed phoneme will have subsided below said predetermined amplitude level and before the time for a fricative sound in said analyzed phoneme will have subsided below said predetermined amplitude level, and
    gate means operatively connected to said first and second outputs for developing said third signal when there is a simultaneous presence of both said first and second outputs.

10. Apparatus for analyzing an audio signal for visual display in accordance with claim 4, wherein said phoneme analyzing means additionally includes means for distinguishing between a phoneme sound accompanied by a preceding stop and a similar sound which is preceded only by a slight pause, comprising
    level detector means for producing a first output when said phoneme sound is above a predetermined amplitude level,
    means connected to said level detector means activated when said first output from said level detector means subsides below said predetermined amplitude level for producing a second output having a predetermined time duration longer than the time of a slight pause and shorter than the time duration of two phonemes, and
    gate means opertaively connected to said first and second outputs for developing a signal indicating the presence of a preceding accompanying stop and actuated when there is an absence of said second output while there is also an absence of said first output.

11. Apparatus for analyzing an electrically detected audio signal for visual display to a viewing person, comprising
    phoneme analyzing means for detecting the presence of speech components occurring in a plurality of frequency bands and developing therefrom a plurality of respective signals for respective speech characteristics in said phoneme, and
    a plurality of individual indicators superimposed upon the normal field of vision of the viewing person connected for actuation by said respective signals, such that the viewing person may visually discern a phoneme by the display presented by said indicators.

12. Apparatus for analyzing an electrically detected audio signal for display in accordance with claim 11, wherein said indicators include individual lights operably mounted to an eyeglass frame in the normal vision area of the viewing person.

13. Apparatus for analyzing an audio signal for visual display in accordance with claim 11, wherein said phoneme analyzing means additionally includes means for distinguishing between a phoneme sound accompanied by a preceding stop and a similar sound which is preceded only by a slight pause, comprising
    level detector means for producing a first output when said phoneme sound is above a predetermined amplitude level,
    means connected to said level detector means activated when said first output from said level detector means subsides below the predetermined amplitude level for producing a second output having a predetermined time duration longer than the time of a slight pause and shorter than the time duration of two phonemes, and
    gate means operatively connected to said first and second outputs for developing a signal indicating the presence of a preceding accompanying stop and actuated when there is an absence of said second output while there is also an absence of said first output.

14. Apparatus for analyzing an electrically detected audio signal for visual display to a viewing person, comprising
    phoneme analyzing means for detecting the presence of speech components occurring in a frequency band of the speech spectrum and developing therefrom a signal indicative of a respective speech characteristic, and
    an indicator superimposed upon the normal field of vision of the viewing person connected for actuation by said signal such that the viewing person may visually discern the presence of said characteristic by the display presented by said indicator.

References Cited

UNITED STATES PATENTS

| | | |
|---|---|---|
| 3,286,031 | 11/1966 | Geddes. |
| 3,265,814 | 8/1966 | Maeda et al. |
| 3,234,332 | 2/1966 | Belar. |
| 3,198,884 | 8/1965 | Dersch. |
| 3,170,979 | 2/1965 | Baldwin et al. ______ 178—7.85 |
| 2,500,646 | 3/1950 | Riesz. |
| 2,388,170 | 10/1945 | McCollum __________ 178—6.5 |
| 2,556,586 | 6/1951 | Johnston. |
| 2,150,364 | 3/1939 | Dudley. |
| 3,344,233 | 9/1967 | Tufts. |

KATHLEEN H. CLAFFY, Primary Examiner

ROBERT P. TAYLOR, Assistant Examiner

U.S. Cl. X.R.

178—6

UNITED STATES PATENT OFFICE

CERTIFICATE OF CORRECTION

Patent No. 3,463,885                                            August 26, 1969

Hubert W. Upton

It is certified that error appears in the above identified patent and that said Letters Patent are hereby corrected as shown below:

In the heading to the printed specification, line 3, "assignor to" should read -- assignor of 15 percent to --.

Signed and sealed this 5th day of May 1970.

(SEAL)
Attest:

Edward M. Fletcher, Jr.                             WILLIAM E. SCHUYLER, JR.
Attesting Officer                                                Commissioner of Patents